US006907614B2

(12) United States Patent
Sawada et al.

(10) Patent No.: US 6,907,614 B2
(45) Date of Patent: Jun. 14, 2005

(54) DISK CARTRIDGE

(75) Inventors: Tsutomu Sawada, Kyoto (JP); Hiroshi Kishida, Kyoto (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 542 days.

(21) Appl. No.: 09/749,306

(22) Filed: Dec. 27, 2000

(65) Prior Publication Data

US 2001/0014078 A1 Aug. 16, 2001

(30) Foreign Application Priority Data

Dec. 27, 1999 (JP) .......................................... 11-370569
Dec. 22, 2000 (JP) ....................................... 2000-390465

(51) Int. Cl.⁷ .............................. G11B 23/03; G11B 7/26
(52) U.S. Cl. ..................................... 720/739; 720/728
(58) Field of Search .............................. 720/728, 729, 720/732, 738, 739; 369/291, 290, 277, 272

(56) References Cited

U.S. PATENT DOCUMENTS

| 5,048,008 | A | * | 9/1991 | Haruna | 369/291 |
| 5,072,326 | A | * | 12/1991 | Ikebe et al. | 369/291 |
| 5,073,889 | A | * | 12/1991 | Rayner | 369/291 |
| 5,121,277 | A | * | 6/1992 | Ikebe et al. | 369/291 |
| 5,488,605 | A | * | 1/1996 | Ishimatsu | 369/291 |
| 5,793,742 | A | * | 8/1998 | Sandell et al. | 369/291 |
| 6,078,562 | A | * | 6/2000 | Kikuchi | 369/291 |
| 6,094,326 | A | * | 7/2000 | Ikebe et al. | 369/291 |
| 6,118,757 | A | * | 9/2000 | Olsen et al. | 369/291 |
| 6,157,517 | A | * | 12/2000 | Kishida | 369/291 |
| 6,212,038 | B1 | * | 4/2001 | Kishida | 369/291 |
| 6,418,113 | B1 | * | 7/2002 | Ikebe et al. | 369/291 |

FOREIGN PATENT DOCUMENTS

JP  HEI 5-6758  1/1993
JP  2508449  4/1995

* cited by examiner

Primary Examiner—George J. Letscher
Assistant Examiner—Christopher R. Magee
(74) Attorney, Agent, or Firm—Volentine Francos & Whitt, P.L.L.C.

(57) ABSTRACT

A disk cartridge having a shutter constructed slidable in both rightward and leftward directions. One surface of a cartridge casing is provided with a first guide groove formed between an upper surface of a front end wall of one half shell and a lower surface of a front end wall of the other half shell. The front end wall of the above-mentioned other half shell is partially cut out to provide a cut portion that extends up to the upper surface of the front end wall of the one half shell. By inserting a first engagement protrusion and a second engagement protrusion formed a the first slider through the cut portion into the first guide groove, the shutter is mounted on the casing body.

10 Claims, 11 Drawing Sheets

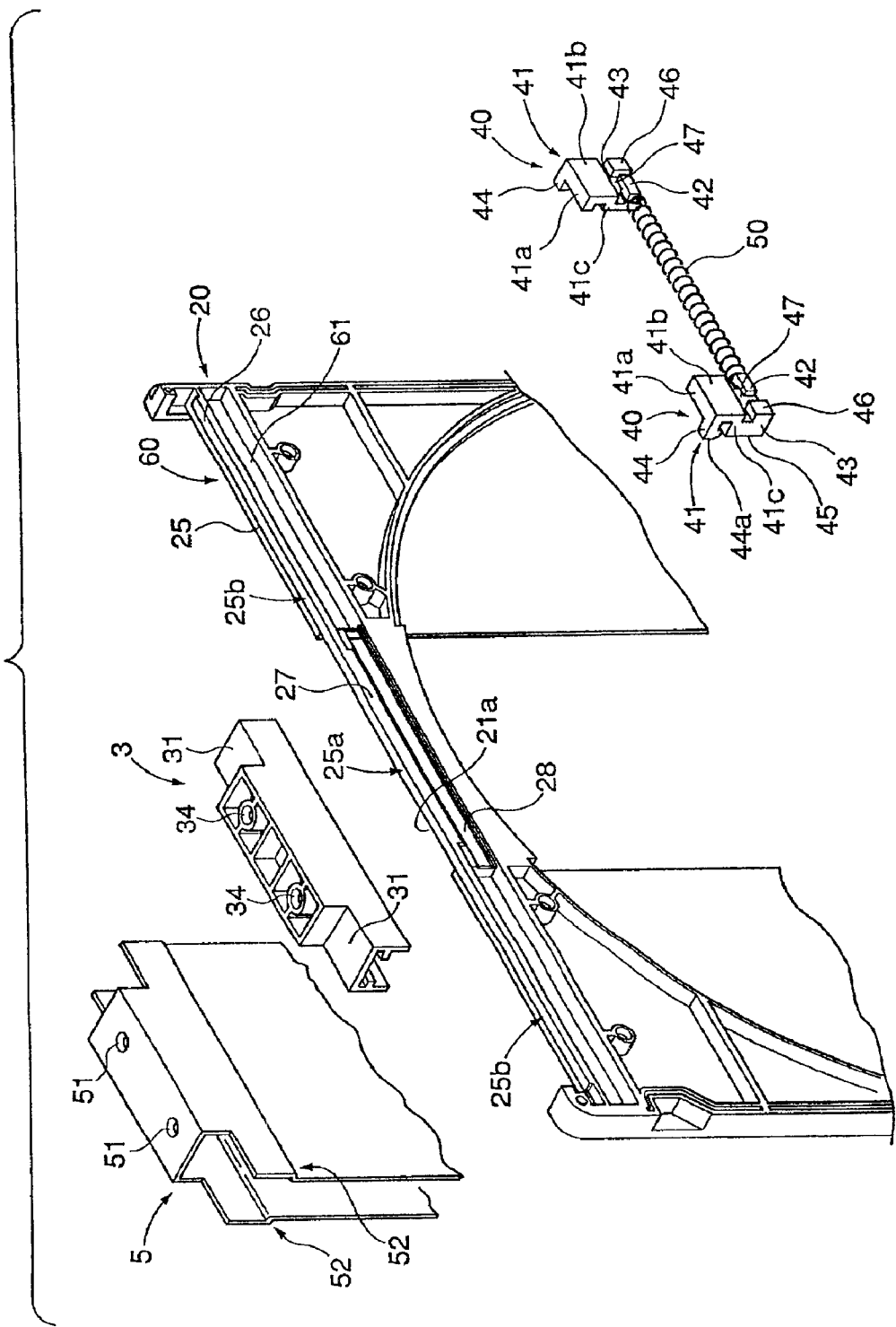

DISK CARTRIDGE

BACKGROUND OF THE INVENTION

1. Field of the Invention

The present invention relates to a disk cartridge that rotatably houses therein a disk-shaped recording medium such as an optical disk or a magnetic disk, and in particular, to a disk cartridge of a type capable of sliding a shutter thereof in both rightward and leftward directions with respect to a neutral position in which the shutter closes a window for allowing a head to gain access therein and for allowing a drive shaft to be inserted therein.

2. Description of the Related Arts

Conventionally, in order to load an equipment or a device with a disk-shaped recording medium such as an optical disk or a magneto-optical disk, a disk cartridge that rotatably houses therein the disk-shaped recording medium has been employed. This disk cartridge is provided with a window for allowing a head to gain access therein and for allowing a drive shaft to be inserted therein, and this window is constructed to be opened and closed by a shutter that has a generally bracket-like shape in cross sectional and is slidably provided on the surface of the disk cartridge. When this disk cartridge is loaded into a disk drive unit, the window is opened by sliding the shutter of the disk cartridge by a shutter drive pin of the disk drive unit for the purpose of executing operations to read and write on the disk.

In a disk cartridge that houses therein a disk capable of being read and written on its both surfaces and that is able to be loaded into a disk drive unit with either one of the upper and lower surfaces being facing up, the shutter drive pin of the disk drive unit is driven in one direction and the shutter of the disk cartridge is made slidable in both the rightward and leftward directions relative to a neutral position in which the shutter closes the window for allowing a head to gain access therein and for allowing a drive shaft to be inserted therein, in order to prevent the shutter drive mechanism of the disk drive unit from being complicated.

As a shutter mechanism of this type, for example, there are disclosed:
(1) a mechanism that employs two torsion coil springs (Japanese Patent Publication No. HEI 5-6758), and
(2) a mechanism provided with a metallic guide shaft (Japanese Patent No. 2508449).
Any of them has, however, such disadvantages as requiring a great number of components and as high cost. Particularly, in the mechanism (2), the slider and the shutter must be preliminarily connected to the guide shaft into a sub-assembly, and thereafter the sub-assembly must be connected to the cartridge casing. This causes a problem that the assembling work is difficult, and causes other problems.

SUMMARY OF THE INVENTION

Accordingly, one object of the present invention is to provide an inexpensive disk cartridge, in which the shutter is slidable in both the rightward and leftward directions with respect to a neutral position thereof, in which the number of components constituting a shutter mechanism is reduced, and in which the assembling work of the disk cartridge is facilitated.

Another object of the present invention is to provide a disk cartridge in which the shutter slides thereon smoothly and stably.

Still another object of the present invention is to provide a disk cartridge whose shutter and casing body have a high structural strength.

In order to achieve those and other objects of the present invention, according to the first aspect thereof, there is provided a disk cartridge comprising: a casing body, made of a pair of half shells, for rotatably housing a disk-shaped recording medium therein; a shutter made of a first slider and a shutter plate, wherein the first slider is slidable in both rightward and leftward directions with respect to a neutral position in which a window, provided in the casing body, through which a drive shaft is inserted and through which a head is allowed to access, is closed, and wherein the casing body has a first guide groove which extends in a direction in which the shutter is opened and closed, and which is formed on a front edge side of one of surfaces of the casing body; a first engagement protrusion and a second engagement protrusion which are formed on both side edge portions of an inner surface of the first slider so as to be slidably engaged with the first guide groove; a pair of second sliders which are slidably engaged with the first guide groove outside the first engagement protrusion and the second engagement protrusion in the first guide groove; a spring means for connecting the pair of second sliders and for pulling them to each other; and a stopper which is projectingly provided on the casing body so as to abut against an inner surface of each of the pair of second sliders, wherein the first guide groove is formed between an upper surface of a front edge wall of one of the pair of half shells and a lower surface of a front edge wall of the other thereof, along the front edge wall, wherein the casing body has, at a central portion of the front edge, a cutout portion which is formed by cutting out the front edge wall of the other thereof and which extends up to the upper surface of the front edge wall of the one thereof, and wherein the first slider and the shutter are mounted on the casing body by inserting the first engagement protrusion and the second engagement protrusion formed on the first slider into the first guide groove through the cutout portion. This construction allows the first slider, or the shutter made by attaching the shutter plate to the first slider, to be mounted on the casing body assembled with the disk-shaped recording medium therein and with the pair of second sliders connected together by the spring means. Therefore, there is provided a disk cartridge whose assembling is easy.

According to the second aspect of the present invention, there is provided a disk cartridge comprising: a casing body, made of a pair of half shells, for rotatably housing a disk-shaped recording medium therein; a shutter which is slidable in both rightward and leftward directions with respect to a neutral position in which a window, provided in the casing body, through which a drive shaft is inserted and through which a head is allowed to access, is closed, and wherein the casing body has a first guide groove which extends in a direction in which the shutter is opened and closed, and which is formed on a front edge side of one of surfaces of the casing body; a first engagement protrusion and a second engagement protrusion which are formed on both side edge portions of an inner surface of the shutter so as to be slidably engaged with the first guide groove; a pair of second sliders which are slidably engaged with the first guide groove outside the first engagement protrusion and the second engagement protrusion in the first guide groove; a spring means for connecting the pair of second sliders and for pulling them to each other; and a stopper which is projectingly provided on the casing body so as to abut against an inner surface of each of the pair of second sliders, wherein the first guide groove is formed between an upper surface of a front edge wall of one of the pair of half shells and a lower surface of a front edge wall of the other thereof, along the front edge wall, wherein the casing body has, at a central portion of the front edge, a cutout portion which is formed by cutting out the front edge wall of the other thereof and which extends up to the upper surface of the front edge wall of the one thereof, and wherein the shutter is mounted on the casing body by inserting the first engagement protrusion and the second engagement protrusion formed on the shutter into the first guide groove through the cutout portion. This construction allows the shutter to be mounted on the casing body assembled with the disk-shaped recording medium and the pair of second sliders connected together by the spring means, similarly in the aforementioned case. Therefore, a disk cartridge, which can be assembled with easy assembling work, can be provided.

In the disk cartridge of the present invention, the cutout portion may be formed generally at a center of the central portion of the front edge of the casing body. With this construction, a disk cartridge, which can be assembled with easy assembling work and has a shutter that is hard to come off the casing body even if an external force of drop impact or the like is applied.

In the disk cartridge of the present invention, a plate-shaped protrusion may be formed on an opposite inner surface to the inner surface of the first slider or the shutter on which the first engagement protrusion and the second engagement protrusion are formed, and there may be formed a pair of second guide grooves on the other of surfaces of the casing body in the both rightward and leftward directions so as to be parallel to the first guide groove, in which the second guide grooves engage and guide the plate-shaped protrusion. With this construction, the sliding operation of the first slider or the shutter can be guided by both surfaces of the disk cartridge, and therefore, the operation can be further stabilized.

In the disk cartridge of the present invention, the first engagement protrusion and the second engagement protrusion may be integrated with each other by an extension plate that extends therebetween. If this construction is adopted, then there is the merit that the structural strength of the first slider or the shutter can be improved.

Further, in the disk cartridge of the present invention, it is acceptable that the front edge wall of the other of the pair of half shells extends with its being bent from a front edge of a wall portion which continuously extends throughout an entire width of the other thereof, and the cutout portion is made by cutting out part of the front edge wall. If this construction is adopted, the wall portion, that functions as a rail when the first slider or the shutter slidingly moves, continuously extends throughout the entire width of the half shell. Therefore, the sliding movement of the first slider or the shutter becomes smooth and stabilized, and further, the structural strength is improved.

BRIEF DESCRIPTION OF THE DRAWINGS

These and other objects and features of the present invention will become clear from the following description taken in conjunction with the preferred embodiments thereof with reference to the accompanying drawings, in which:

FIG. 4 is an exploded perspective view of part of the disk cartridge of FIG. 1;

FIG. 5(*b*) is a view of an outer surface of part of the upper wall side half shell;

FIG. 6(*b*) is a view of an outer surface of part of the bottom wall side half shell;

FIG. 7(*b*) is a sectional view of the first slider;

FIG. 9(*b*) is a perspective view of a second slider to be located on the right-hand side;

DETAILED DESCRIPTION OF THE PREFERRED EMBODIMENTS

Figure 1:
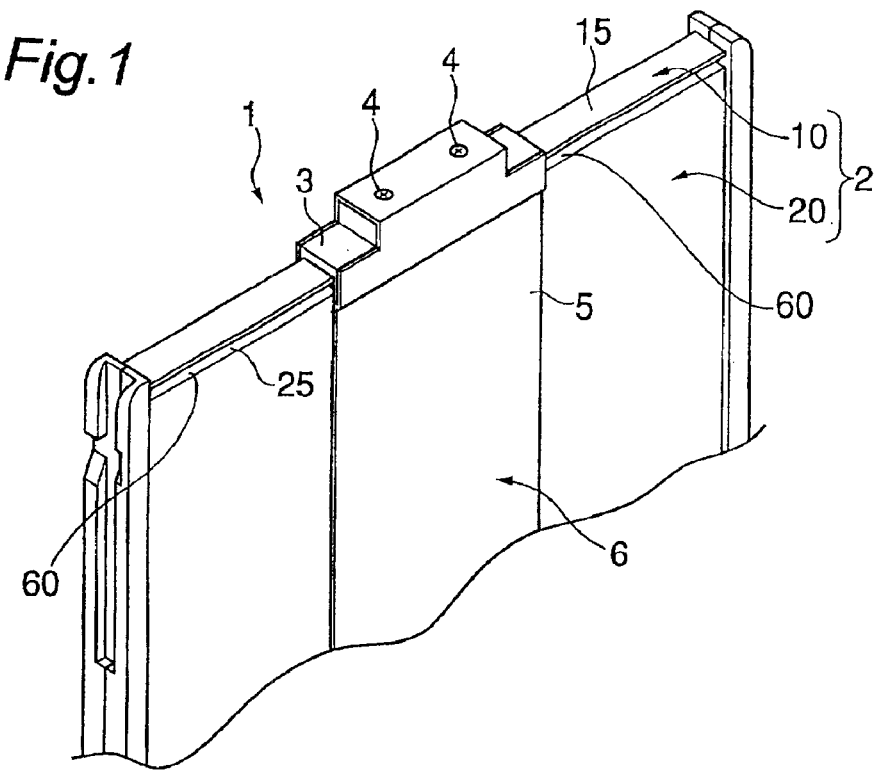
FIG. 1 is a perspective view of part of a disk cartridge according to a first embodiment of the present invention.

Before describing the present invention, it is to be noted that like components and corresponding components are denoted by like reference numerals throughout the accompanying drawings.

FIG. 1 is a perspective view of part of a disk cartridge according to the first embodiment of the present invention. A disk cartridge 1 rotatably houses a disk-shaped recording medium, such as a digital video disc (DVD), in a hollow casing body 2 with a shape of a rectangular thin plate. The casing body 2 is constructed of a stacked structure in which an upper wall side half shell 10 and a bottom wall side half shell 20 are overlapped to each other, and in which both shells 10, 20 are made of a plastic material and have an identical thickness. Between a lower surface of a front end wall 15 of the upper wall side half shell 10 and an upper surface of a front end wall 25 of the bottom wall side half shell 20 is provided a first guide groove 60 formed along the front end walls 15 and 25. This construction allows a shutter 6, which is constituted by a shutter plate (opening/closing plate) 5 that has a generally bracket-like shape in cross section and that is attached by screws 4 to a first slider 3 made of a resin material, to slide in both rightward and leftward directions. The front end walls 15 and 25 of both the half shells 10 and 20 are located in different positions; and when both the half shells 10 and 20 are combined with each other, the first guide groove 60 is formed on the bottom wall side half shell 20 side so as to extend in a direction in which the shutter is opened and closed. The shutter plate 5 may be made of a metal or a synthetic resin material.

Figure 2:
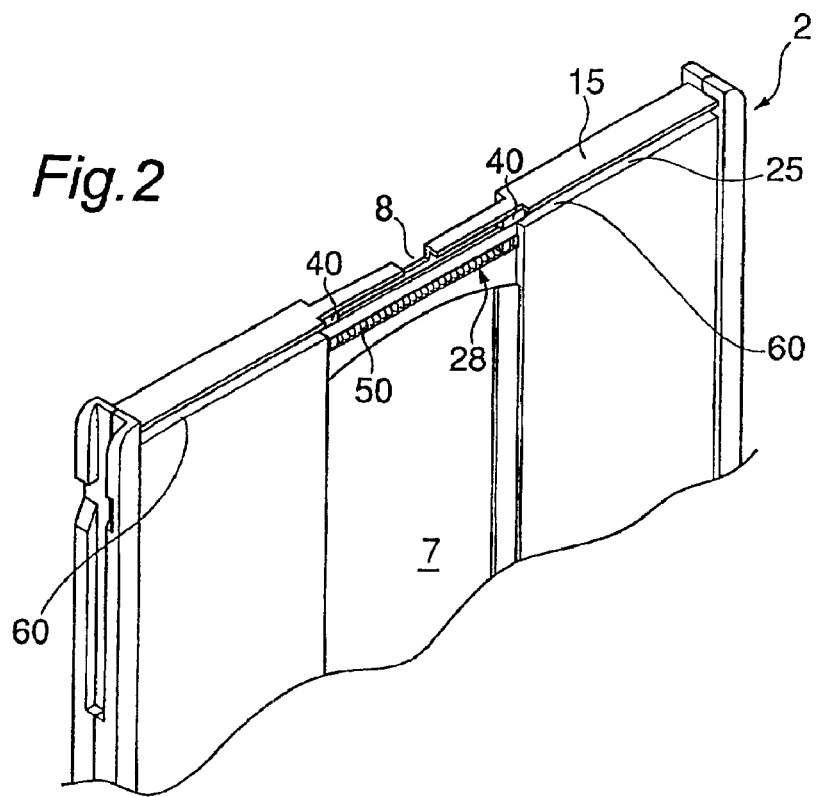
FIG. 2 is a schematic perspective view showing a state in which the shutter is removed from the disk cartridge of FIG. 1.

FIG. 2 is a schematic perspective view of the disk cartridge of FIG. 1 from which the shutter is removed. The casing body 2 is provided with a window 7 for allowing a head to gain access therein and for allowing a drive shaft to be inserted therein. The window 7 extends from its center portion toward its front end in a direction in which the disk cartridge is loaded into a disk drive (not shown). At a center portion of the front end edge of the casing body 2, there is provided a cut portion (cutout portion) 8 that is formed by cutting away the front end wall 15 of the upper wall side half shell 10. The cut portion 8 extends to the upper surface of the front end wall 25 of the bottom wall side half shell 20. The casing body 2 is provided with a generally rectangular spring housing section 28, which houses therein a spring 50 that serves as a spring means for pulling and connecting a pair of second sliders 40 and 40 to each other (the disk-shaped recording medium is not shown).

Figure 5A:
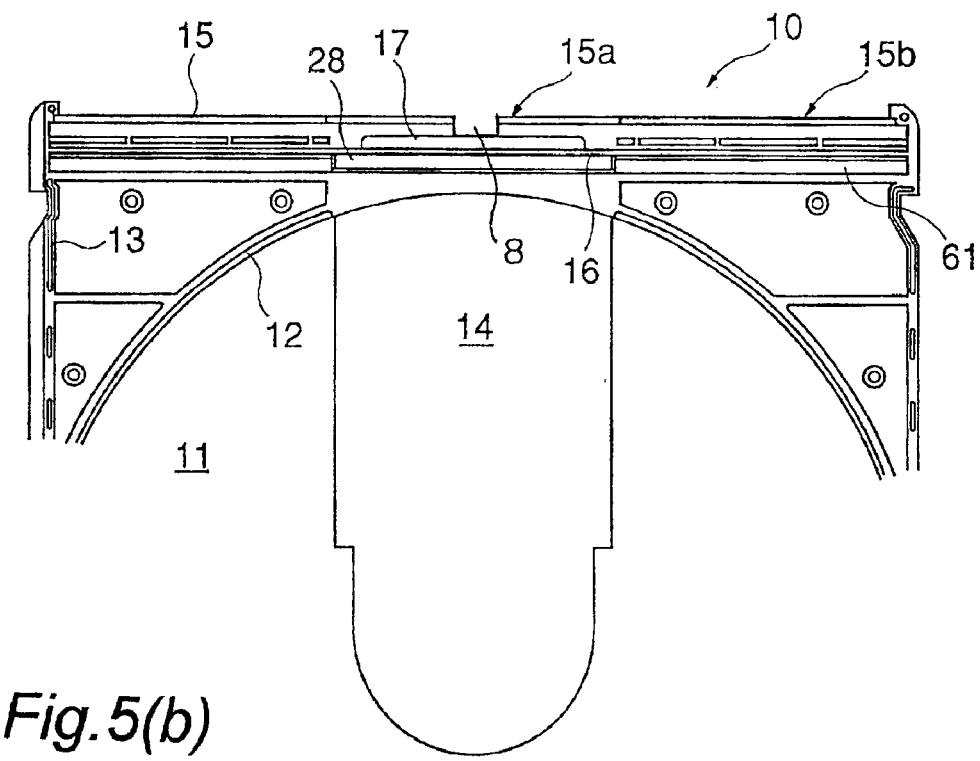
FIG. 5(*a*) is a view of an inner surface of part of an upper wall side half shell.
Figure 5B:
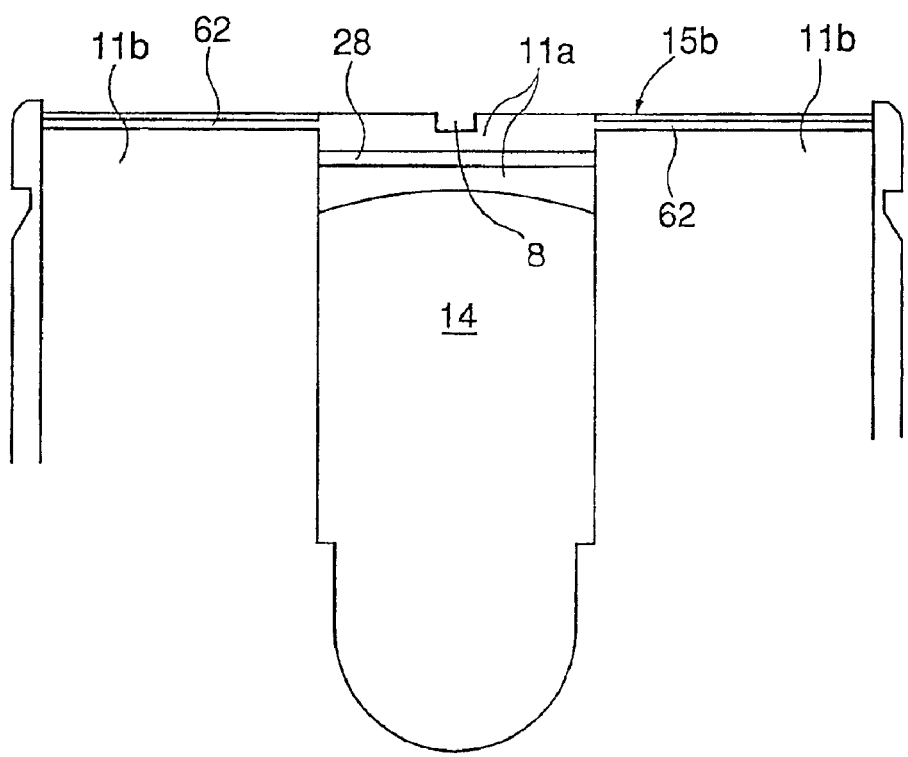
Figure 6A:
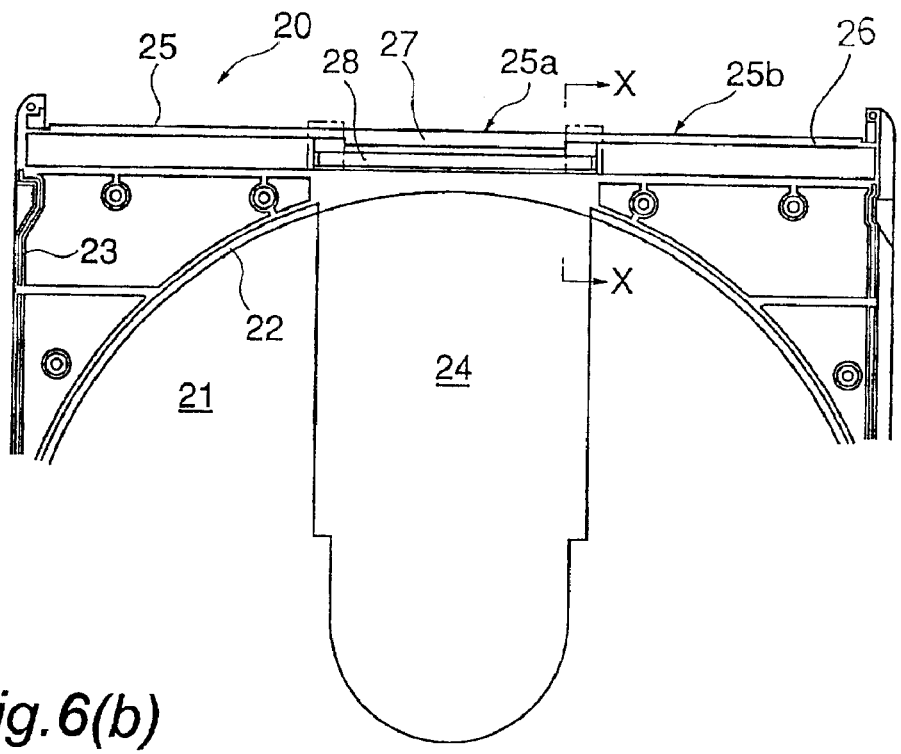
FIG. 6(*a*) is a view of an inner surface of part of a bottom wall side half shell.
Figure 6B:
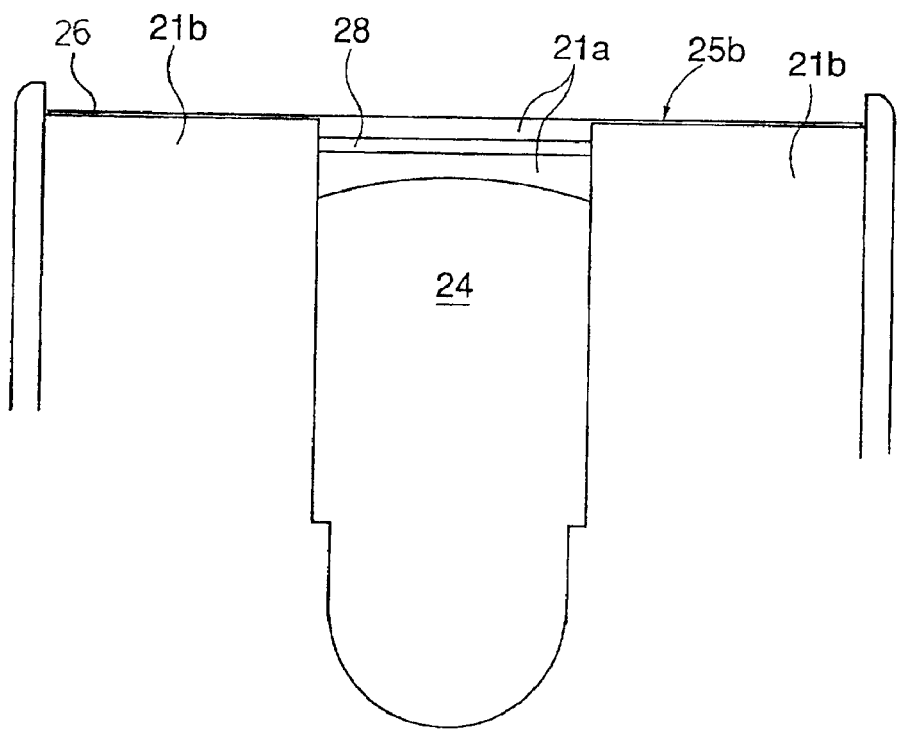
Figure 7A:
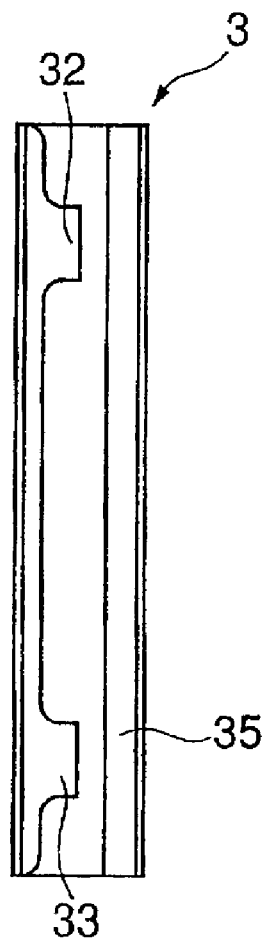
FIG. 7(*a*) is a bottom view of a first slider.
Figure 7B:
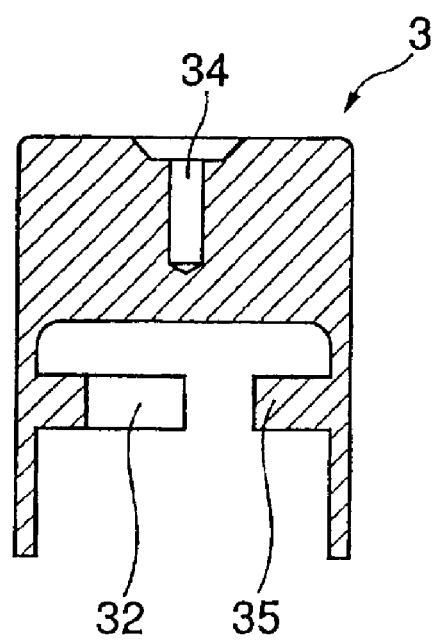
Figure 8:
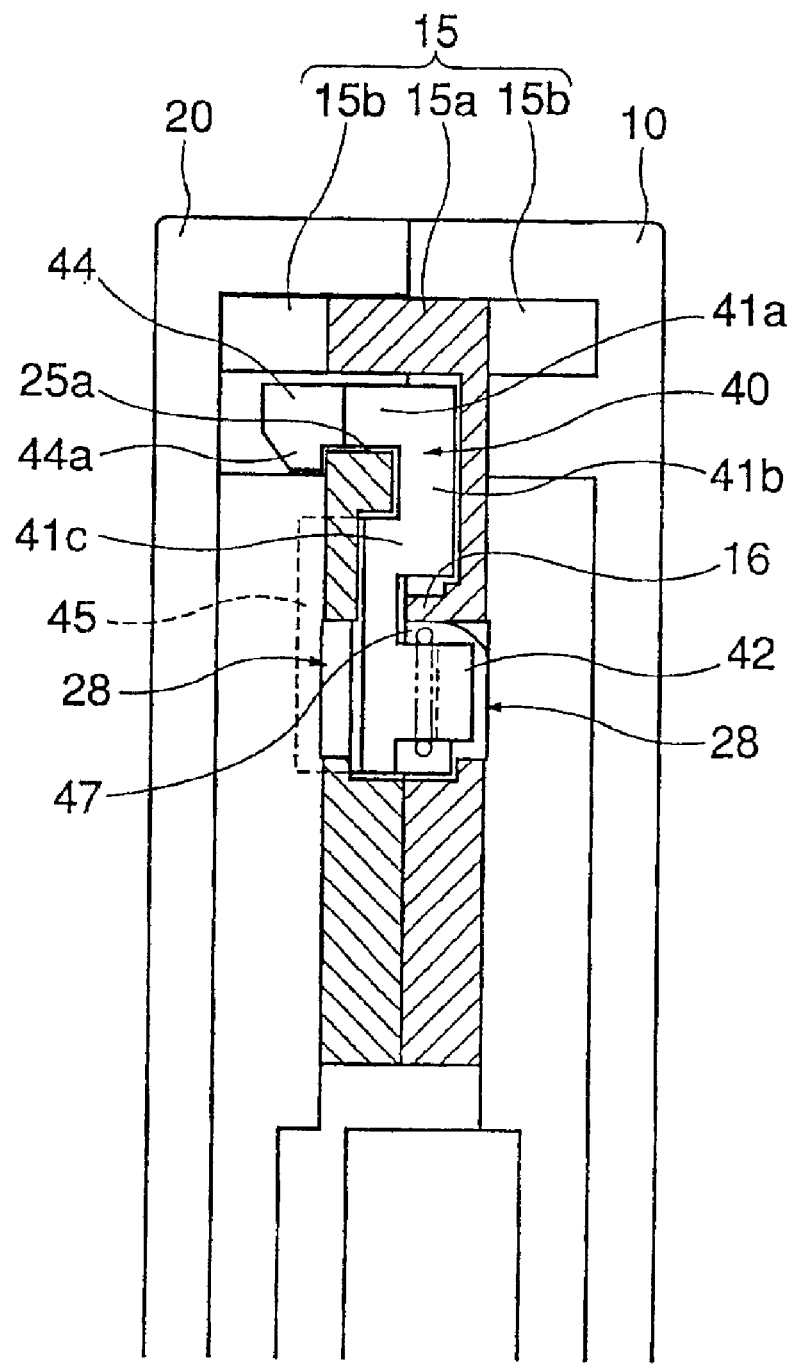
FIG. 8 is a sectional view taken along the line X—X of FIG. 6(*a*), showing a state in which both the half shells of FIGS. 5(*a*) and 5(*b*) and FIGS. 6(*a*) and 6(*b*) and a shutter mechanism are assembled with each other.
Figure 9A:
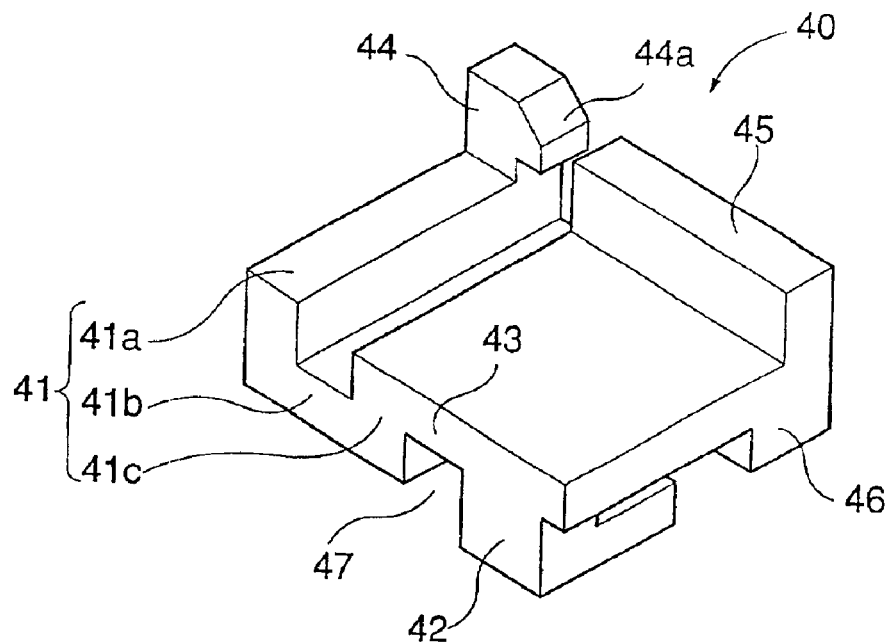
FIG. 9(*a*) is a perspective view of a second slider to be located on the left-hand side.
Figure 9B:
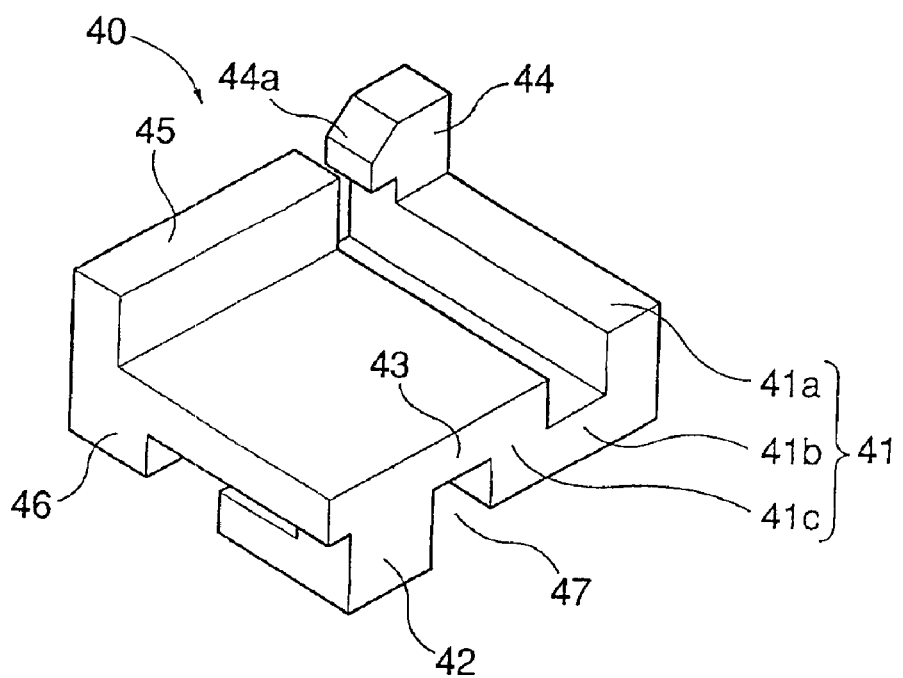
Figure 10A:
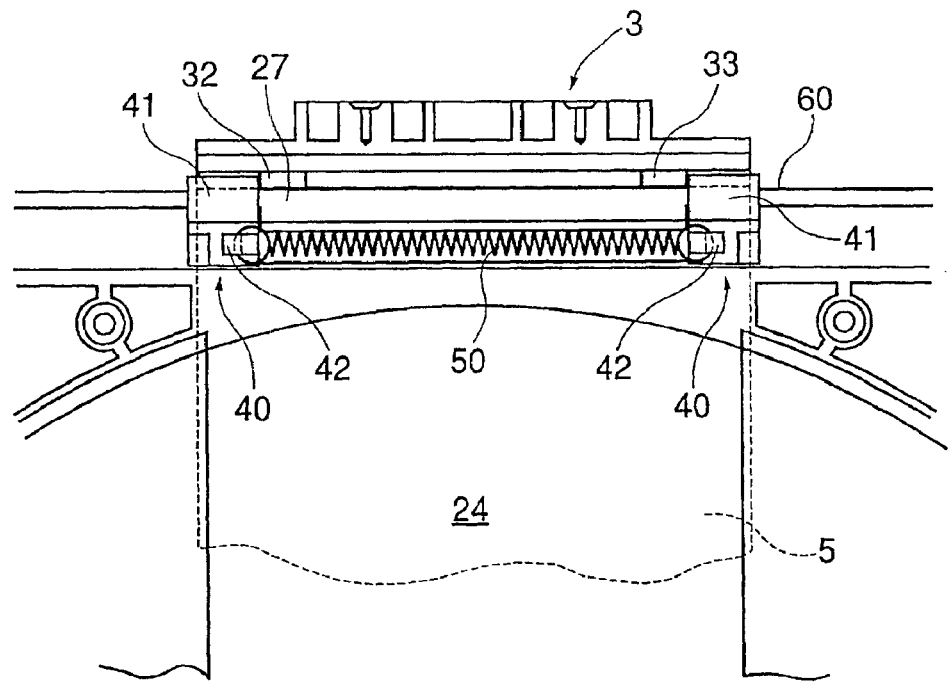
FIGS. 10(*a*) and 10(*b*) are explanatory views for explaining the operation of the second sliders.
Figure 10B:
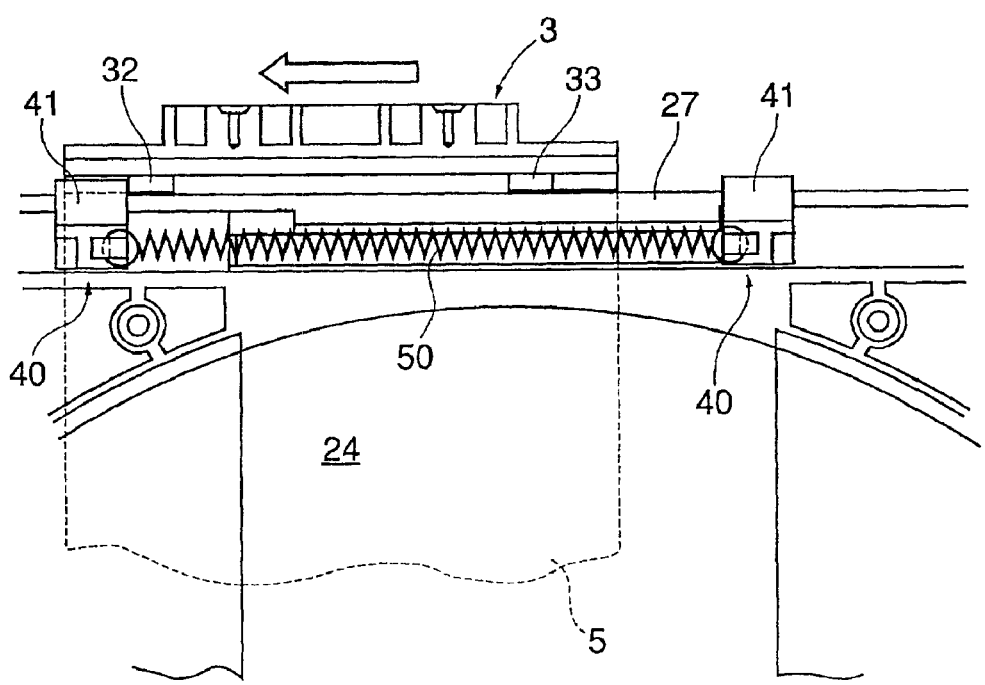

The construction of the disk cartridge 1 of the present invention will be described in more detail next. FIG. 4 is an exploded perspective view of part of the disk cartridge. FIGS. 5(a) and 5(b) are a partial view of an inner surface of the upper wall side half shell, and a partial view of an outer surface thereof. FIGS. 6(a) and 6(b) are a partial view of an inner surface of the bottom wall side half shell, and a partial view of an outer surface thereof. FIGS. 7(a) and 7(b) show a bottom view and a sectional view of the first slider. FIG. 8 is a sectional view taken along the line X—X of FIG. 6(a) showing a state in which both the half shells of FIGS. 5(a) and 5(b) and FIGS. 6(a) and 6(b) and a shutter mechanism are assembled with each other (neither the first slider 3 nor the shutter plate 5 that has a generally bracket-like cross sectional shape is shown). FIGS. 9(a) and 9(b) are perspective views of a second slider to be located on the left-hand side and a second slider to be located on the right-hand side. FIGS. 10(a) and 10(b) are explanatory views for explaining the operation of the second sliders. The disk cartridge 1 is constituted by the casing body 2 composed of the upper wall side half shell 10 and the bottom wall side half shell 20, the pair of second sliders 40 and 40 that are pulled and connected to each other by the spring 50 assembled into the casing body 2, the first slider 3 that is slidably engaged with the first guide groove 60 that extends in the direction in which the shutter is opened and closed and that is formed on the bottom wall side half shell 20 located on the front end edge side of the casing body 2, and the shutter plate 5 that has a generally bracket-like cross sectional shape and that is attached to the first slider 3 by the screws 4. The shutter plate 5 attached to the first slider 3 functions as the shutter 6.

The upper wall side half shell 10 and the bottom wall side half shell 20 constituting the casing body 2 have an upper wall 11 and a bottom wall 21, respectively, which are formed integrally with peripheral walls 12 and 22 for demarcating (or defining) a disk housing space and with side walls 13 and 23 that extend along the side edge portions of the upper wall 11 and the bottom wall 21. Both the half shells 10 and 20 are provided with windows 14 and 24 for allowing a head to gain access therein and for allowing a drive shaft to be inserted therein. The windows 14 and 24 extends to the front ends from the center portions of the upper wall 11 and the bottom wall 21 in a direction in which the disk cartridge is loaded into a disk drive (not shown). The windows 14 and 24 become the window 7 shown in FIG. 2 when the half shells 10 and 20 are assembled with each other. These windows 14 and 24 are normally covered with the shutter 6, as shown in FIG. 1, and the shutter 6 is constructed so as to slide in both rightward and leftward directions relative to a neutral position in which the windows 14 and 24 are covered with the shutter 6.

The front end walls 15 and 25 of both the half shells 10 and 20 are located in different positions as described above. The half shells 10 and 20 are constructed so that the first guide groove 60, which extends in the direction in which the shutter is opened and closed, is formed between the front end walls 15 and 25 when both the half shells 10 and 20 are assembled with each other. In addition, a linear protrusion 26 extending in the direction in which the shutter is opened and closed is formed on the upper surface of the front end wall 25 of the bottom wall side half shell 20 that constitutes the first guide groove 60. Only the center portions 15a and 25a of the front end walls 15 and 25 (i.e., the portions corresponding to the width of the windows 14 and 24) have a smaller dimension in the thickness direction of the casing body 2 than that of the other portions 15b and 25b, so that the head travel is not disturbed when the disk cartridge is loaded into the disk drive unit and the head gains its access to the disk. Accompanying this arrangement, the surfaces of the upper wall 11 and the bottom wall 21 have front end center portions 11a and 21a recessed relative to their right-hand and left-hand side portions 11b and 21b. In the casing body 2, there is formed a guide space 61 that communicates with the first guide groove 60 and that guides the second sliders 40 and 40 and the spring 50 when both the half shells 10 and 20 are assembled with each other. The front end center portions 11a and 21a corresponding to the guide space 61 are provided with a generally rectangular spring housing section 28, forming a housing space for the spring 50 when the shutter 6 is located in the neutral position. At generally in the center of the center portion 15a of the front end wall 15 of the upper wall side half shell 10, there is formed the cut portion 8 by partially cutting out the front end wall 15, the cut portion 8 extending to the upper surface of the bottom wall side half shell 20 when the casing body 2 is formed by combining the upper wall side half shell 10 with the bottom wall side half shell 20. A second guide groove 62, which extends in the direction in which the shutter 6 is opened and closed, is formed on a lower surface of the front end wall 15 of a portion 11b located on both the right-hand and left-hand sides of the surface of the upper wall 11.

As shown in FIG. 4, the first slider 3 has a projecting shape (convex shape) when viewed from the front side, forming recessed portions (concave portions) 31 on both right-hand and left-hand shoulder portions. The recessed portions 31 are used for opening the shutter 6 by being hooked by a shutter drive pin when the disk cartridge 1 is loaded in the disk drive unit, the shutter 6 being constructed of the shutter plate 5 that has a generally bracket-like cross sectional shape and that is attached to the first slider 3. The first slider 3 has a generally bracket-like cross sectional shape and, it is provided with a first engagement protrusion 32 and a second engagement protrusion 33, which are formed on both side edge portions of the inner surfaces of the slider and which are slidably engaged with the first guide groove 60. Further, on the inner surface that belongs to the slider 3 and faces the first engagement protrusion 32 and the second engagement protrusion 33, there is formed a plate-shaped protrusion 35 which is slidably engaged with the second guide groove 62. The slider 3 has its top portion provided with screw holes 34 for the screwing of the shutter plate 5 that has the generally bracket-like cross sectional shape.

The shutter plate 5, which has the generally bracket-like cross sectional shape and is attached to the first slider 3, has a shape, such that a portion corresponding to the recessed portion 31 formed on the first slider 3 is cut out. The top portion of the shutter plate 5 is provided with concave openings 51 for the purpose of screwing. The shutter plate 5 has stepped portions 52, which are formed in positions corresponding to both the bottom edge portions of the first slider 3 so as to be fit to the casing body 2 in order to reliably close the window 7 shown in FIG. 2 (to prevent dust and the like from entering inside the cartridge) when the disk cartridge 1 shown in FIG. 1 is formed.

The pair of second sliders 40 and 40 housed in the guide space (groove) 61 are provided with engagement portions 41 and 41 to be slidably engaged with the first guide groove 60 at the front end portion in the state shown in FIG. 4. The pair of second sliders 40 and 40 are arranged on both the right-hand and left-hand sides of the first slider 3 so that the first engagement protrusion 32 and the second engagement protrusion 33 of the first slider 3 are located between the engagement portions 41 and 41. The engagement portions 41 of the second sliders 40 and 40 are constituted by an engagement upper wall 41*a*, an engagement side wall 41*b* and an engagement lower wall 41*c*, and they are formed to have a generally bracket-like cross sectional shape. The second sliders 40 and 40 (the left-hand side slider shown in FIG. 9(*a*) and the right-hand side slider shown in FIG. 9(*b*) are laterally symmetrical) have positioning portions 43, which are provided with hook portions 42 for hooking the spring, provided on the engagement lower wall 41*c*. The spring 50 is connected to the spring hooking portions 42 so as to urge the second sliders 40 and 40 in a direction of approaching to each other. The second sliders 40 and 40 are each provided with an upper wall extension 44 that extends from part of the engagement upper wall 41*a* and that has an engagement pawl (claw or hook) 44*a* at the tip. This upper wall extension 44 is constructed so as to be engaged with the linear protrusion 26 provided on the front end wall 25 of the bottom wall side half shell 20. The second sliders 40 and 40 are each securely engaged with the front end wall 25 by the upper wall extension 44 that has the engagement pawl 44*a* and the engagement portion 41 that has the generally bracket-like cross sectional shape.

A protrusion 45 that protrudes in the same direction as that of the upper wall extension 44 is provided at the end portion of the engagement lower wall 41*c* and the positioning portion 43 of the second sliders 40 and 40 where the upper wall extension 44 is provided, and a protection wall 46 that protrudes in the direction opposite to the protrusion 45 is provided in the positioning portion 43. The protrusion 45 is provided so that the second sliders 40 and 40 smoothly and reliably slide along the guide space 61 of the bottom wall side half shell 20. The protection wall 46 prevents the spring 50 from coming off the spring hook portion 42. There is formed a groove 47 parallel to the direction in which the shutter of the first slider 3 is opened and closed, by the engagement lower wall 41*c*, the positioning portion 43 and the spring hooking portion 42. This groove 47 is constructed so as to engage with a linear protrusion 16 that extends parallel to the first guide groove 60 formed on the upper wall side half shell 10 of the casing body. The lower surface of the linear protrusion 16 is formed into an arc shape except for the portion of the window so as not to interfere with the spring 50.

The surfaces that belong to the second sliders 40 and 40 and face each other with the spring 50 therebetween partially come in contact with a stopper 17 provided on the upper wall side half shell 10 and a stopper 27 provided on the bottom wall side half shell 20. Thanks to this construction, when the second sliders 40 and 40 are positioned, the shutter 6, which is constructed of the shutter plate 5 that has the generally bracket-like cross sectional shape and that is attached to the first slider 3, is located in the neutral position closing the windows 14 and 24.

The disk cartridge 1 constructed as above can be assembled in the following manner of (1) or (2). According to the manner (1), the second sliders 40 and 40 are arranged on the inner surface side of the bottom wall side half shell 20, and the spring 50 is connected to the spring hook portions 42 of the second sliders 40 and 40. Thereafter, the upper wall side half shell 10 is superposed and fixed on the bottom wall side half shell 20 so as to provide the state shown in FIG. 2. Subsequently, the first engagement protrusion 32 and the second engagement protrusion 33 of the first slider 3 are successively fitted into the cut portion 8 shown in FIG. 2 (or, firstly the second engagement protrusion 33, and thereafter the first engagement protrusion 32), so that the first engagement protrusion 32 and the second engagement protrusion 33 of the first slider 3 are engaged with the first guide groove 60. Thus, the first slider 3 can easily be mounted on the casing body. Subsequently, by attaching the shutter plate 5 that has the generally bracket-like cross sectional shape to the first slider 3 by the screws 4, the disk cartridge 1 as shown in FIG. 1 can be assembled. Meanwhile, according to the manner (2), the second sliders 40 and 40 are arranged on the inner surface side of the bottom wall side half shell 20, and the spring 50 is connected to the spring hook portions 42 of the second sliders 40 and 40. Thereafter, the upper wall side half shell 10 is superposed on the bottom wall side half shell 20 so as to provide the state shown in FIG. 2. By using the shutter 6 assembled by attaching the shutter plate 5 that has the generally bracket-like cross sectional shape to the first slider 3 by the screws 4, and by merely fitting successively the first engagement protrusion 32 and the second engagement protrusion 33 into the cut portion 8 shown in FIG. 2 (or, firstly the second engagement protrusion 33, and thereafter the first engagement protrusion 32), so that the first engagement protrusion 32 and the second engagement protrusion 33 of the first slider 3, to which the shutter 6 has been assembled, are engaged with the first guide groove 60, the disk cartridge 1 as shown in FIG. 1 can easily be assembled (setting of the disk-shaped recording medium is omitted). It is to be noted that the first engagement protrusion 32 and the second engagement protrusion 33 generally have the same width dimension in the direction in which the shutter is opened and closed. It is a matter of course that the cut width (cutout width) of the cut portion (cutout portion) 8 in the direction in which the shutter is opened and closed is designed so as to be at least greater (wider) than the width of the first engagement protrusion 32 (or the second engagement protrusion 33) in the direction, in order to facilitate the insertion of the first engagement protrusion 32 (or the second engagement protrusion 33) into the cut portion 8.

When assembled as described above, as shown in FIGS. 10(*a*) and 10(*b*), the second sliders 40 and 40 come in contact, from right-hand and left-hand sides, with the first engagement protrusion 32 and the second engagement protrusion 33 of the first slider 3 assembled into the shutter 6 (FIG. 10(*a*)), and the second sliders 40 and 40 are positioned by the stoppers 17 (not shown) and 27 formed on the casing body, so that the first engagement protrusion 32 and the second engagement protrusion 33 are located in laterally symmetrical positions with respect to the center of the first guide groove 60. Thus, the shutter 6 constructed of the shutter plate 5 that has the generally bracket-like cross sectional shape and that is attached to the first slider 3 is located in the neutral position, consequently closing the windows 14 and 24. It is to be noted that the stoppers 17 and 27 abut against the surfaces that belong to the second sliders 40 and 40 and face each other with the spring 50 therebetween.

When sliding the first slider 3 assembled into the shutter 6 in either the rightward or leftward direction from the neutral position (the slider is slid in the leftward direction in FIG. 10(*b*)), the first engagement protrusion 32 of the first slider 3 moves while pushing one of the second sliders 40. At this time, the other of the second sliders 40 is retained in position by the stoppers 17 (not shown) and 27, and therefore, the spring 50 is charged (or expanded). Consequently, the second sliders 40 and 40 are pulled to each other by the spring 50. Therefore, if the force to retain in position the shutter 6 constructed of the shutter plate 5 that has the generally bracket-like cross sectional shape and that is attached to the first slider 3 in the opened position is released, then the shutter 6 is restored into the neutral position.

Although the shutter plate 5 has the generally bracket-like cross sectional shape according to the above description, the shape of the shutter plate 5 is not limited to this. For example, it is possible to employ a shutter plate (not shown) constructed of two protruding plates that have no top portion provided with the concave openings 51 for screwing the shutter plate 5. In this case, there is provided a shutter (not shown) made by attaching a shutter plate (not shown) constructed of the aforementioned two protruding plates by screws to a first slider (not shown) that has screw holes provided on both side portions. Although the means for attaching the shutter plate to the first slider is provided by screws according to the above description, the attaching means is also not limited to this. For example, it is possible to provide an attaching means for attaching the shutter plate to the first slider by, for example, providing the first slider and the shutter plate with engagement portions to be engaged with each other and engaging these engagement portions with each other. Alternatively, it is possible to attach the shutter plate to the first slider by means of an adhesive or the like, or to attach the shutter plate to the first slider by means of ultrasonic welding.

Figure 3:
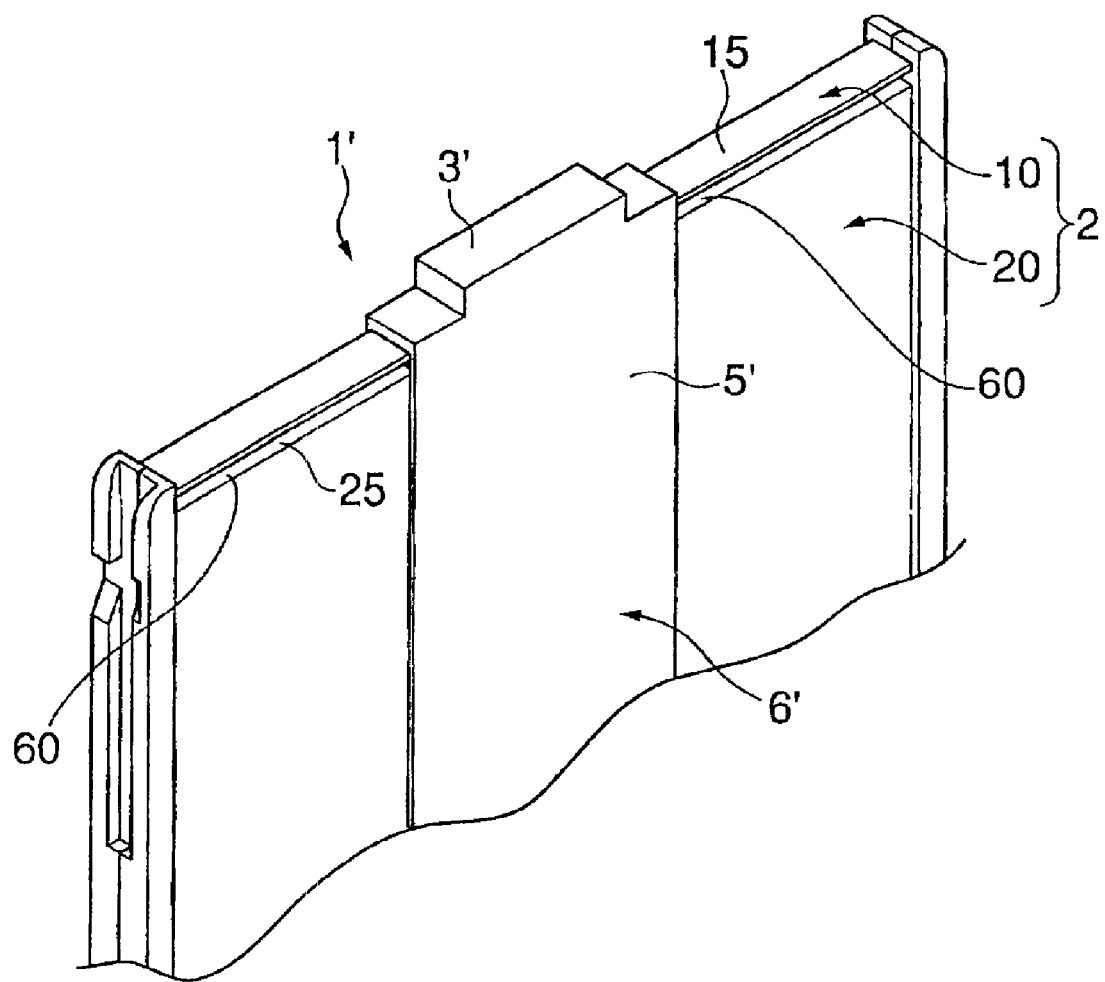
FIG. 3 is a perspective view of part of a disk cartridge according to a second embodiment of the present invention.

FIG. 3 is a perspective view of part of a disk cartridge according to the second embodiment of the present invention. The present embodiment is identical to the first embodiment except for the arrangement that a disk cartridge 1' has a first slider 3' cum shutter 6' in which a shutter plate 5' that plays the role of the shutter plate 5 is integrally formed continuously with both bottom end portions of the first slider 3 that has a generally bracket-like cross sectional shape described in the first embodiment, and no description is made for this construction. With this construction, the number of components can be reduced in contrast with that of the disk cartridge 1 of the first embodiment, and the assembling work of the disk cartridge can be made easier, allowing the cost to be lower by that much. The first slider 3' cum shutter 6' is, of course, made of a synthetic resin material, and its top portion needs no screw hole 34 that is needed in the first slider 3 of the fist embodiment.

Figure 11:
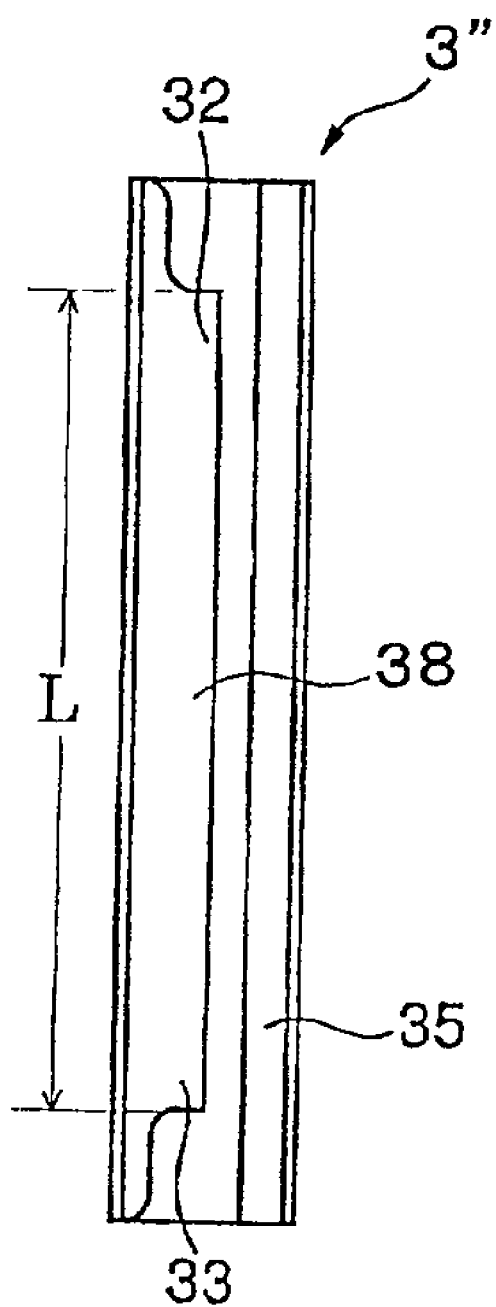
FIG. 11 is an explanatory view for explaining a first slider according to another embodiment.

Next, a concrete example of the first slider and the cut portion (cutout portion) provided on the upper wall side half shell will be described with reference to FIG. 11 and FIG. 12. FIG. 11 is a figure corresponding to FIG. 7(a) showing the bottom surface side of a first slider 3". The first slider 3" of this concrete example differs from the first slider 3 of FIG. 7(a) in that the first engagement protrusion 32 and the second engagement protrusion 33 are integrated into one body by an extension plate 38 that extends between the two protrusions. This construction has the merit that the structural strength is improved, as exemplified by increased rigidity with respect to torsion.

Figure 12:
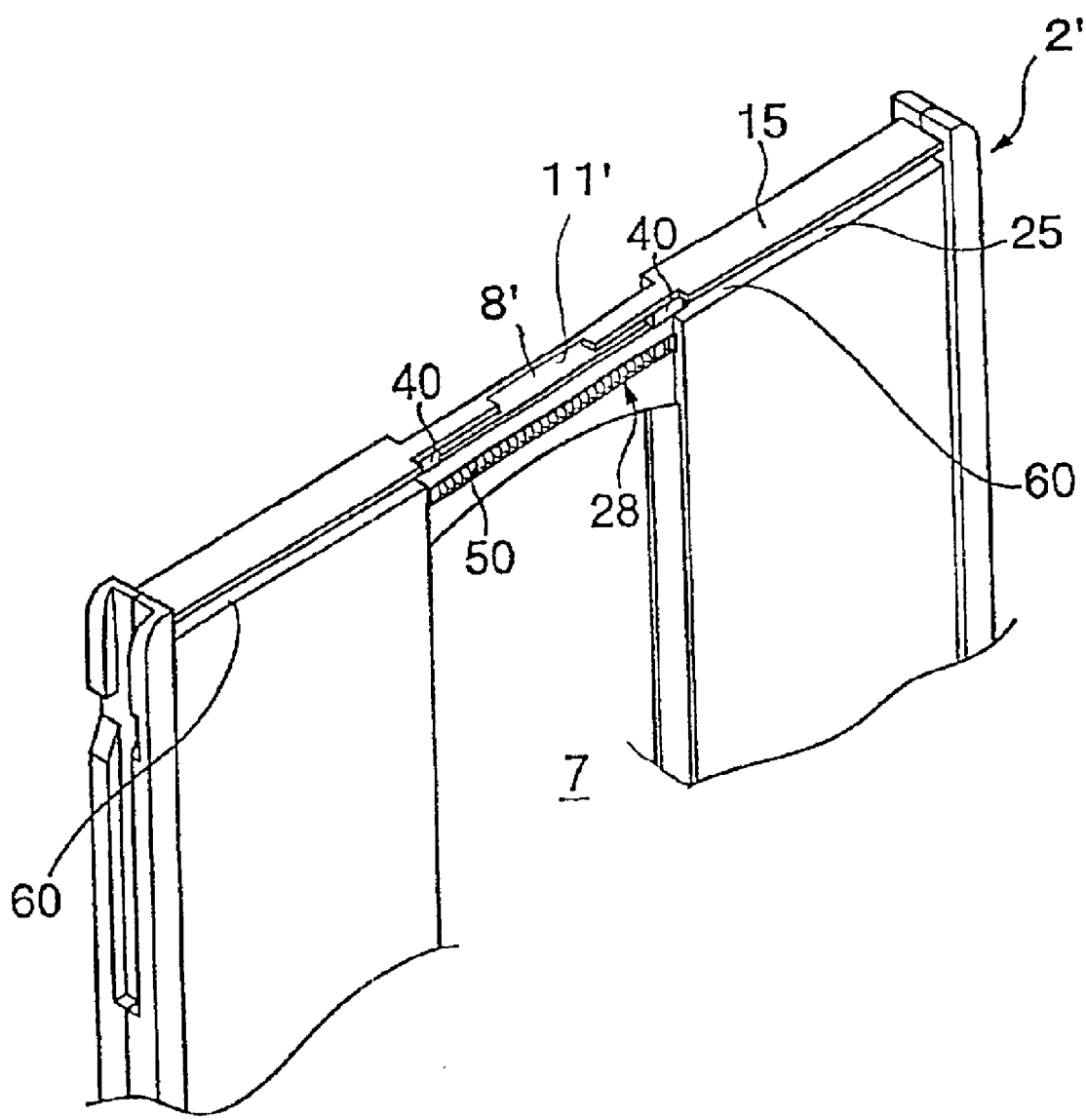
FIG. 12 is an explanatory view for explaining a cutout portion that is provided on the upper wall side half shell which is used for the first slider of FIG. 11.

FIG. 12 corresponds to FIG. 2 and shows a casing body 2' employed for the first slider 3". The first engagement protrusion 32 and the second engagement protrusion 33 are integrated into one body by the extension plate 38 in the first slider 3", and therefore, the dimension of the cut portion 8' in the case width direction is made greater than that of the cut portion 8 of FIG. 2, in order to improve the nature of insertion of the first slider 3".

In the casing body 2' of FIG. 12, the front end wall 15 of the upper wall side half shell extends from the front end edge of a wall portion 11' that continuously extends throughout the entire width of the half shell, while being bent at an angle of about 90 degrees to the wall portion 11'. The cut portion 8' is constructed by cutting out part of the front end wall 15 in the sliding direction in FIG. 12. In other words, the portion of the wall portion 11' is not cut out. As a result, the wall portion 11', which functions as a rail when the first slider 3" slides, extends straightly continuously with a predetermined thickness throughout the entire width of the half shell. Therefore, the slide movement of the first slider 3" becomes smooth and stable, and further, the structural strength of the casing body 2' is increased.

It is to be noted that the length in the direction of width (length of the sliding direction) of the cut portion 8' is made shorter than the entire length L of the integrated body of the first engagement protrusion 32 and the second engagement protrusion 33, in order to retain the mounted first slider 3". However, the cut portion 8' has a certain degree of depth, and therefore, if the first slider and the casing body are made of a material such as a resin that has flexibility, the first slider 3" can be mounted on the casing body even if the total length L is slightly longer than the length of the cut portion 8' in the casing width direction.

As for the concrete dimensions, the length of the cut portion 8' in the sliding direction is preferably about 5 to 15 mm, and is more preferably about 10 mm, if L=30 mm. This dimensional construction facilitates the mounting of the first slider 3" and is able to effectively prevent the first slider 3" from unexpectedly coming off. Furthermore, it is possible to remove the slider from the casing body and replace it with another slider or shutter, if necessary.

Even if the shutter is constructed of a slider and a shutter plate that are separated, or even if the shutter is constructed of a slider and a shutter plate integrally, the concrete example described with reference to FIG. 11 and FIG. 12 can be similarly applied thereto.

As described above, according to the disk cartridge of the present invention, the number of components (or parts) is smaller than that of the conventional disk cartridge, and further, the first slider, the shutter, and so on, can be mounted on the casing body in the state in which the casing body is assembled with a disk-shaped recording medium or the like being housed. Thus, there is realized an effect that the assembling work becomes very easy. Also, because the number of components is small and the assembling work is easy, there is realized an effect that the disk cartridge can be provided at low cost.

Although the present invention has been fully described in connection with the preferred embodiments thereof with reference to the accompanying drawings, it is to be noted that a variety of modifications are apparent to those skilled in this art. It should be appreciated that such modifications are included within the scope of the present invention unless they depart from the scope of the present invention specified by the appended claims.

What is claimed is:

1. A disk cartridge comprising:
   a casing body, made of a pair of half shells, for rotatably housing a disk-shaped recording medium therein;
   a shutter made of a first slider and a shutter plate, wherein the first slider is slidable in both rightward and leftward directions with respect to a neutral position in which a window, provided in the casing body, through which a drive shaft is inserted and through which a head is allowed to access, is closed, and wherein the casing body has a first guide groove which extends in a direction in which the shutter is opened and closed, and which is formed on a front edge side of one of surfaces of the casing body and is exposed to an outside of the casing body;

a first engagement protrusion and a second engagement protrusion which are formed on both side edge portions of an inner surface of the first slider so as to be slidably engaged with the first guide groove;

a pair of second sliders which are slidably engaged with the first guide groove outside the first engagement protrusion and the second engagement protrusion in the first guide groove;

a spring means for connecting the pair of second sliders and for pulling them to each other; and a stopper which is projectingly provided on the casing body so as to abut against an inner surface of each of the pair of second sliders, wherein the first guide groove is fanned between an upper surface of a front edge wall of one of the pair of half shells and a lower surface of a front edge wall of the other thereof, along the front edge wall, wherein the casing body has, at a central portion of the front edge, a cutout portion which is formed by cutting out the front edge wall of the other thereof and which extends up to the upper surface of the front edge wall of the one thereof, and wherein the first slider and the shutter are mounted on the casing body by inserting the first engagement protrusion and the second engagement protrusion formed on the first slider into the first guide groove through the cutout portion.

2. The disk cartridge of claim 1, wherein the cutout portion is formed generally at a center of the central portion of the front edge of the casing body.

3. The disk cartridge of claim 1, wherein a plate-shaped protrusion is formed on an opposite inner surface to the inner surface of the first slider on which the first engagement protrusion and the second engagement protrusion are formed, and wherein there is formed a pair of second guide grooves on the other of surfaces of the casing body in the both rightward and leftward directions so as to be parallel to the first guide groove, in which the second guide grooves engage and guide the plate-shaped protrusion.

4. The disk cartridge of claim 1, wherein the first engagement protrusion and the second engagement protrusion are integrated with each other by an extension plate that extends therebetween.

5. The disk cartridge of claim 1, wherein the front edge wall of the other of the pair of half shells extends with its being bent from a front edge of a wall portion which continuously extends throughout an entire width of the other thereof, and wherein the cutout portion is made by cutting out part of the front edge wall.

6. A disk cartridge comprising:

a casing body, made of a pair of half shells, for rotatably housing a disk-shaped recording medium therein;

a shutter which is slidable in both rightward and leftward directions with respect to a neutral position in which a window, provided in the casing body, through which a drive shaft is inserted and through which a head is allowed to access, is closed, and wherein the casing body has a first guide groove which extends in a direction in which the shutter is opened and closed, and which is formed on a front edge side of one of surfaces of the casing body and is exposed to an outside of the casing body;

a first engagement protrusion and a second engagement protrusion which are formed on both side edge portions of an inner surface of the shutter so as to be slidably engaged with the first guide groove;

a pair of second sliders which are slidably engaged with the first guide groove outside the first engagement protrusion and the second engagement protrusion in the first guide groove;

a spring means for connecting the pair of second sliders and for pulling them to each other; and a stopper which is projectingly provided on the casing body so as to abut against an inner surface of each of the pair of second sliders, wherein the first guide groove is formed between an upper surface of a front edge wall of one of the pair of half shells and a lower surface of a front edge wall of the other thereof, along the front edge wall;

wherein the casing body has, at a central portion of the front edge, a cutout portion which is formed by cutting out the front edge wall of the other thereof and which extends up to the upper surface of the front edge wall of the one thereof, and wherein the shutter is mounted on the casing body by inserting the first engagement protrusion and the second engagement protrusion formed on the shutter into the first guide groove through the cutout portion.

7. The disk cartridge of claim 6, wherein the cutout portion is formed generally at a center of the central portion of the front edge of the casing body.

8. The disk cartridge of claim 6, wherein a plate-shaped protrusion is formed on an opposite inner surface to the inner surface of the shutter on which the first engagement protrusion and the second engagement protrusion are formed, and wherein there is formed a pair of second guide grooves on the other of surfaces of the casing body in the both rightward and leftward directions so as to be parallel to the first guide groove, in which the second guide grooves engage and guide the plate-shaped protrusion.

9. The disk cartridge of claim 6, wherein the first engagement protrusion and the second engagement protrusion are integrated with each other by an extension plate that extends therebetween.

10. The disk cartridge of claim 6, wherein the front edge wall of the other of the pair of half shells extends with its being bent from a front edge of a wall portion which continuously extends throughout an entire width of the other thereof, and wherein the cutout portion is made by cutting out part of the front edge wall.

* * * * *